US011263520B2

(12) United States Patent
Chen et al.

(10) Patent No.: US 11,263,520 B2
(45) Date of Patent: Mar. 1, 2022

(54) INSTRUCTION GENERATION PROCESS MULTIPLEXING METHOD AND DEVICE

(71) Applicant: Shanghai Cambricon Information Technology Co., Ltd., Pudong New Area (CN)

(72) Inventors: Yunji Chen, Pudong New Area (CN); Yixuan Ren, Pudong New Area (CN); Zidong Du, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

(21) Appl. No.: 16/425,931

(22) Filed: May 29, 2019

(65) Prior Publication Data

US 2019/0311251 A1    Oct. 10, 2019

Related U.S. Application Data

(63) Continuation-in-part of application No. PCT/CN2017/099936, filed on Aug. 31, 2017.

(30) Foreign Application Priority Data

Nov. 30, 2016    (CN) .......................... 201611092372.7

(51) Int. Cl.
*G06N 3/063*    (2006.01)
*G06F 9/38*    (2018.01)
(Continued)

(52) U.S. Cl.
CPC .............. *G06N 3/063* (2013.01); *G06F 8/30* (2013.01); *G06F 9/3808* (2013.01);
(Continued)

(58) Field of Classification Search
CPC .......... G06N 3/063; G06N 20/00; G06N 3/02; G06F 9/3808; G06F 9/3812; G06F 8/30
(Continued)

(56) References Cited

U.S. PATENT DOCUMENTS 6,308,320 B1 * 10/2001 Burch ...................... G06F 8/48
717/145
9,009,149 B2 * 4/2015 He .................... G06F 16/24578
707/728
(Continued)

FOREIGN PATENT DOCUMENTS

CN    101567006 A  * 10/2009
CN    101567006 A    10/2009
(Continued)

OTHER PUBLICATIONS

Morad et al., "Efficient Dense and Sparse Matrix Multiplication on GP-SIMD" 2014 24th International Workshop on Power and Timing Modeling, Optimization and Simulation (PATMOS). (Year: 2014).*
(Continued)

*Primary Examiner* — Miranda M Huang
*Assistant Examiner* — Chase P. Hinckley
(74) *Attorney, Agent, or Firm* — Getech Law LLC; Jun Ye (57) ABSTRACT

Aspects of reusing neural network instructions are described herein. The aspects may include a computing device configured to calculate a hash value of a neural network layer based on the layer information thereof. A determination unit may be configured to determine whether the hash value exists in a hash table. If the hash value is included in the hash table, one or more neural network instructions that correspond to the hash value may be reused.

22 Claims, 4 Drawing Sheets

(51) Int. Cl.
    *G06F 8/30*    (2018.01)
    *G06N 3/02*    (2006.01)
    *G06N 3/06*    (2006.01)

(52) U.S. Cl.
    CPC .............. *G06F 9/3812* (2013.01); *G06N 3/02* (2013.01); *G06N 3/06* (2013.01)

(58) Field of Classification Search
    USPC .......................................................... 706/41
    See application file for complete search history.

(56) References Cited

U.S. PATENT DOCUMENTS

| | | | |
|---|---|---|---|
| 9,299,347 B1* | 3/2016 | Siohan | G10L 15/02 |
| 9,449,257 B2* | 9/2016 | Shi | G06K 9/00986 |
| 9,940,534 B1* | 4/2018 | Yang | G06N 3/0454 |
| 10,043,095 B2* | 8/2018 | Yang | G06N 3/0454 |
| 10,223,115 B2* | 3/2019 | Han | G06F 15/76 |
| 10,282,348 B2* | 5/2019 | Henry | G06F 9/44505 |
| 10,387,771 B2* | 8/2019 | Judd | G06N 3/063 |
| 10,528,864 B2* | 1/2020 | Dally | G06N 3/0454 |
| 11,029,949 B2* | 6/2021 | Henry | G06N 3/04 |
| 2010/0023727 A1* | 1/2010 | Lim | H04L 45/00 711/216 |
| 2010/0250966 A1* | 9/2010 | Olson | H04L 9/12 713/190 |
| 2013/0339649 A1* | 12/2013 | Hsu | G06F 3/14 711/170 |
| 2014/0188893 A1* | 7/2014 | Kobayashi | G06F 16/2255 707/747 |
| 2014/0219279 A1* | 8/2014 | Gross | H04L 5/0048 370/392 |
| 2014/0280813 A1* | 9/2014 | Ramachandran | H04L 67/14 709/223 |
| 2015/0098470 A1* | 4/2015 | Sun | H04L 45/748 370/392 |
| 2015/0109024 A1* | 4/2015 | Abdelfattah | G06F 30/34 326/41 |
| 2015/0205727 A1* | 7/2015 | Kimmel | G06F 3/0611 711/103 |
| 2015/0281081 A1* | 10/2015 | Rajahalme | H04L 45/7453 370/392 |
| 2015/0363328 A1* | 12/2015 | Candelaria | G06F 12/0864 711/216 |
| 2016/0026912 A1* | 1/2016 | Falcon | G06N 3/0454 706/25 |
| 2016/0180200 A1* | 6/2016 | Vijayanarasimhan | G06N 3/082 382/157 |
| 2016/0259730 A1* | 9/2016 | Svendsen | G06F 12/0802 |
| 2016/0321187 A1* | 11/2016 | Bernat | G06F 12/1018 |
| 2016/0358043 A1* | 12/2016 | Mu | G06N 3/04 |
| 2017/0011288 A1* | 1/2017 | Brothers | G06F 9/3017 |
| 2017/0103298 A1* | 4/2017 | Ling | G06N 3/0454 |
| 2017/0228643 A1* | 8/2017 | Kurach | G06N 3/08 |
| 2017/0236053 A1* | 8/2017 | Lavigueur | G06N 3/063 706/31 |
| 2017/0323196 A1* | 11/2017 | Gibson | G06F 7/5443 |
| 2018/0101742 A1* | 4/2018 | Burge | G06K 9/00926 |
| 2018/0101763 A1* | 4/2018 | Barnard | G06N 3/04 |
| 2018/0270153 A1* | 9/2018 | Singh | H04L 45/7453 |
| 2018/0276528 A1* | 9/2018 | Lin | G06N 3/04 |
| 2018/0276534 A1* | 9/2018 | Henry | G06N 3/0481 |

FOREIGN PATENT DOCUMENTS

| | | | |
|---|---|---|---|
| CN | 104346440 A | * | 2/2015 |
| CN | 104834748 A | * | 8/2015 |
| CN | 105719001 A | | 6/2016 |
| CN | 106557332 A | | 4/2017 |

OTHER PUBLICATIONS

Zhang et al., "Learning Hash Codes for Efficient Content Reuse Detection" Aug. 12-16, 2012, SIGIR '12 pp. 405-414. (Year: 2012).*

Varga et al., "Fast content-based image retrieval using Convolutional Neural Network and hash function" Oct. 9, 2016, IEEE International Conference on Systems, Man, and Cybernetics. (Year: 2016).*

David et al., "DeepChess: End-to-End Deep Neural Network for Automatic Learning in Chess" Sep. 6, 2016, ICANN, pp. 88-96. (Year: 2016).*

Han et al., "Deep Compression: Compressing Deep Neural Networks with Pruning, Trained Quantization and Huffman Coding" Feb. 15, 2016, ICLR, pp. 1-14. (Year: 2016).*

Wang et al., "Learning to Hash for Indexing Big Data—A Survey" Sep. 17, 2015, pp. 1-22. (Year: 2016).*

Chen et al., "Compressing Convolutional Neural Networks in the Frequency Domain" Aug. 13, 2016. (Year: 2016).*

Fang et al., "Supervised Learning of Semantics-Preserving Hashing via Deep Neural Networks for Large-Scale Image Search" Jul. 1, 2015, pp. 1-8. (Year: 2015).*

Zhu et al., "A Deep Neural Network Based Hashing for Efficient Image Retrieval" Oct. 9, 2016, IEEE International Conference on Systems, Man, and Cybernetics. (Year: 2016).*

Wang et al., "Learning Compact Hash Codes for Multimodal Representations Using Orthogonal Deep Structure" Sep. 2015, IEEE Transactions on Multimedia, vol. 17, No. 9, pp. 1404-1416. (Year: 2015).*

Eghbali et al., "Cosine Similarity Search with Multi-Index Hashing" Sep. 14, 2016, pp. 1-15 (Year: 2016).*

Grauman et al., "Learning Binary Hash Codes for Large-Scale Image Search" 2013, In: Cipolla R., Battiato S., Farinella G. (eds) Machine Learning for Computer Vision, Studies in Computational Intelligence, vol. 411. (Year: 2013).*

Lin et al., "Deep Learning of Binary Hash Codes for Fast Image Retrieval" 2015 CVPR, pp. 27-35. (Year: 2015).*

Duan et al., "Weighted Component Hashing of Binary Aggregated Descriptors for Fast Visual Search" Jun. 2015, IEEE Transactions on Multimedia, vol. 17, No. 6, pp. 828-842. (Year: 2015).*

Lin et al., "DeepHash: Getting Regularization, Depth, and Fine-Tuning Right" Jan. 20, 2015. (Year: 2015).*

Shi et al., "Functional Hashing for Compressing Neural Networks" May 20, 2016, pp. 1-10. (Year: 2016).*

Sharma et al., "From High-Level Deep Neural Models to FPGAs" Oct. 15-19, 2016, 49th Annual IEEE/ACM International Symposium on Microarchitecture. (Year: 2016).*

Chi et al., "Prime: A Novel Processing-in-memory Architecture for Neural Network Computation in ReRAM-based Main Memory" Jun. 2016, ACM SIGARCH Computer Architecture News 44(3), pp. 27-39. (Year: 2016).*

Lascorz et al., "TARTAN: Accelerating Fully-Connected and Convolutional Layers in Deep Learning Networks by Exploiting Numerical Precision Variability" Nov. 4, 2016, pp. 1-14, accessed on OpenReview.Net (Year: 2016).*

Guo et al., "CNN Based Hashing for Image Retrieval" Sep. 4, 2015, pp. 1-16. (Year: 2015).*

Shi et al., "HFH: Homologically Functional Hashing for Compressing Deep Neural Networks" Nov. 4, 2016, pp. 1-12, accessed on OpenReview.Net (Year: 2016).*

Spring et al., "Scalable and Sustainable Deep Learning via Randomized Hashiing" Feb. 26, 2016. (Year: 2016).*

Liu et al., "Cambricon: An Instruction Set Architecture for Neural Networks" Jun. 18-22, 2016, ACM/IEEE 43rd Annual International Symposium on Computer Architecture, pp. 393-405. (Year: 2016).*

Durr et al., "Deep Learning on a Raspberry Pi for Real Time Face Recognition" Jul. 3, 2015, pp. 1-4. (Year: 2015).*

Zhao et al., "Deep Semantic Ranking Based Hashing for Multi-Label Image Retrieval" Apr. 19, 2015, Chinese Academy of Sciences. (Year: 2015).*

Do et al., "Learning to Hash with Binary Deep Neural Network" Jul. 18, 2016, pp. 1-16. (Year: 2016).*

(56) References Cited

OTHER PUBLICATIONS

Zhang et al., "Efficient Training of Very Deep Neural Networks for Supervised Hashing" Apr. 21, 2016. (Year: 2016).*
Wang et al., "A Survey on Learning to Hash" Jun. 1, 2016, pp. 1-22. (Year: 2016).*
Zhang et al., "Bit-Scalable Deep Hashing with Regularized Similarity Learning for Image Retrieval and Person Re-Identification" Dec. 2015, IEEE Transactions on Image Processing, vol. 24, No. 12, pp. 4766-4779. (Year: 2015).*
Lin et al., "Towards Convolutional Neural Networks Compression via Global Error Reconstruction" Jul. 2016, pp. 1753-1759. (Year: 2016).*
Vizilter et al., "Real-Time Face Identification via CNN and Boosted Hashing Forest" Jun. 26-Jul. 1, 2016, IEEE, pp. 78-86. (Year: 2016).*
Li et al., "Feature Learning based Deep Supervised Hashing with Pairwise Labels" Apr. 21, 2016, (Year: 2016).*
Hsieh et al., "Accelerating Pointer Chasing in 3D-Stacked Memory: Challenges, Mechanisms, Evaluation" Oct. 2-5, 2016, IEEE 34th International Conference on Computer Design, pp. 25-32. (Year: 2016).*
Lian, Ruo Long, "A Framework for FPGA-Based Acceleration of Neural Network Inference with Limited Numerical Prevision via High-Level Synthesis with Streaming Functionality" Jun. 2016, Thesis University of Toronto, pp. i-103. (Year: 2016).*
Rae et al., "Scaling Memory-Augmented Neural Networks with Sparse Reads and Writes" Oct. 27, 2016, pp. pp. 1-17. (Year: 2016).*
Graves et al., "Hybrid computing using a neural network with dynamic external memory" Oct. 2016. (Year: 2016).*
Canis et al., "LegUp: An Open-Source High-Level Synthesis Tool for FPGA-Based Processor/Accelerator Systems" Sep. 2013, pp. 1-27. (Year: 2013).*
Choi et al., "A Unified Software Approach to Specify Pipeline and Spatial Parallelism in FPGA Hardware" Jul. 2016, pp. 75-82. (Year: 2016).*
Reagan et al., "Minerva: Enabling Low-Power, Highly-Accurate Deep Neural Network Accelerators" Jun. 2016, pp. 267-278. (Year: 2016).*
Chang et al., "Recurrent Neural Networks Hardware Implementation on FPGA" Mar. 4, 2016. (Year: 2016).*
Yuan et al., "CP-FPGA: Computation Data-Aware Software/Hardware Co-design for Nonvolatile FPGAs based on Checkpointing Techniques" Jan. 2016, pp. 569-574. (Year: 2016).*
DiCecco et al., "Caffeinated FPGAs: FPGA Framework for Convolutional Neural Networks" Sep. 30, 2016. (Year: 2016).*
Sharma et al., "From High-Level Deep Neural Models to FPGAs" Oct. 2016. (Year: 2016).*
Absalmayov et al., "FPGA-Accelerated Group-by Aggregation Using Synchronizing Caches" Jun. 2016. (Year: 2016).*
Li et al., "A High Performance FPGA-based Accelerator for Large-Scale Convolutional Neural Networks" Aug. 2016. (Year: 2016).*
Andri et al., "YodaNN: An Ultra-Low Power Convolutional Neural Network Accelerator Based on Binary Weights" Jun. 17, 2016. (Year: 2016).*
Ba et al., "Layer Normalization" Jul. 21, 2016, pp. 1-14. (Year: 2016).*
Chen, et al., "A Small-Footprint Accelerator for Large-Scale Neural Networks", ACM Transactions on Computer Systems, vol. 33, No. 2, Article 6, May 2015, 27 pages.
Du, et al., "An Accelerator for High Efficient Vision Processing", IEEE Transactions on Computer-aided Design of Integrated Circuits and System, vol. 36, No. 2, Feb. 2017, pp. 227-240.
Liu, et al., "Cambricon: An Instruction Set Architecture for Neural Networks", 2016 ACM/IEEE 43rd Annual International Symposium on Computer Architecture, Oct. 12, 2016, pp. 393-405.
Zhang, et al., "Cambricon-X an Accelerator for Sparse Neural Networks", The 49th Annual IEEE/ACM International Symposium on Microarchitecture Article No. 20, Oct. 15, 2016, 12 pages.
Chen, et al., "DaDianNao: A Machine-Learning Supercomputer", 2014 47th Annual IEEE/ACM International Symposium on Microarchitecture, Dec. 13, 2014, pp. 609-622.
Luo, et al., "DaDianNao: A Neural Network Supercomputer", IEEE Transaction on Computers, vol. 66, No. 1, Jan. 2017, pp. 73-88.
Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.
Chen, et al., "DianNao Family: Energy-Efficient Hardware Accelerators for Machine Learning", Communications of he ACM, vol. 59, No. 11, Nov. 2016, pp. 105-112.
Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.
Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.
PCT/CN2017/099936, International Search Report dated Nov. 30, 2017, 5 pages of Translation and 12 pages Original Report.
EP17775111.1, Extended European Search Report dated Feb. 26, 2020, 8 pages.
CN 201711247175.2—Second Office Action, dated May 7, 2020, 8 pages, (no English translation).
CN 201711247174.8—Second Office Action, dated May 27, 2020, 7 pages, (no English translation).

* cited by examiner

INSTRUCTION GENERATION PROCESS MULTIPLEXING METHOD AND DEVICE

BACKGROUND

Computing processes in neural networks may involve machine learning and pattern recognition algorithms. In some respects, instruction generation process for a neural network accelerator or a neural network processor may be relatively complicated. Larger amounts of input data of the neural network may require multiple instructions. In addition, with increasing number of layers in a multilayer neural network, the process of generating instructions for the neural network processor may consume more time and power.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example neural network instruction reuse device. The example neural network instruction reuse device may include a computing device configured to receive layer information associated with a neural network layer and calculate a hash value of the neural network layer based on the received layer information. Further, the example neural network instruction reuse device may include a determination unit configured to retrieve a hash table from a storage device, determine that the hash value exists in the hash table, and identify a head address in the hash table based on the determination that the hash value exists in the hash table, wherein the head address corresponds to the hash value. In addition, the example neural network instruction reuse device may include an instruction modification device configured to retrieve one or more used instructions stored in a storage space that starts from the head address and modify output addresses and input address in each of the one or more used instructions.

Another example aspect of the present disclosure provides an exemplary method for generating neural network instructions. The example method may include receiving, by a computing device, layer information associated with a neural network layer, calculating, by the computing device, a hash value of the neural network layer based on the received layer information, retrieving, by a determination unit, a hash table from a storage device, determining, by the determination unit, that the hash value exists in the hash table, identifying, by the determination unit, a head address in the hash table based on the determination that the hash value exists in the hash table, wherein the head address corresponds to the hash value, retrieving, by an instruction modification device, one or more used instructions stored in a storage space that starts from the head address, and modifying the one or more used instructions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

As machine learning and pattern recognition algorithms become complex, the structure of neural networks may include multiple neural network layers for greater amounts of input data. Each of the multiple neural network layers ("layers" hereinafter) may refer to a group of operations, e.g., convolution, sampling, etc. Instructions for hardware components to perform the operations may become longer and, thus, generating the instructions may consume more time and power.

However, some of the instructions may be reused with respect to different neural network layers. In some examples, when two layers are substantially similar, an instruction generated for the operations at the first layer may be also used for the second layer. Thus, instructions may be reused with some modifications to save time and power.

For example, when an instruction is generated for a layer, a hash value may be calculated based on parameters of the layer, e.g., a layer type, a layer scale, a computation type, etc. In other words, when a hash value is the same as another, the two corresponding layers may be considered as similar for purpose of reusing the instructions.

Thus, prior to generating the instructions for the layer according to conventional methods, a neural network instruction reuse device may be configured to determine if the hash value is stored in a hash table. If the hash table includes the hash value, at least one previously generated instruction may be reused for the layer saving time for regenerating same instructions for different layers in the neural network. If the hash table does not include the hash value, an instruction may be generated according the conventional methods.

Figure 1:
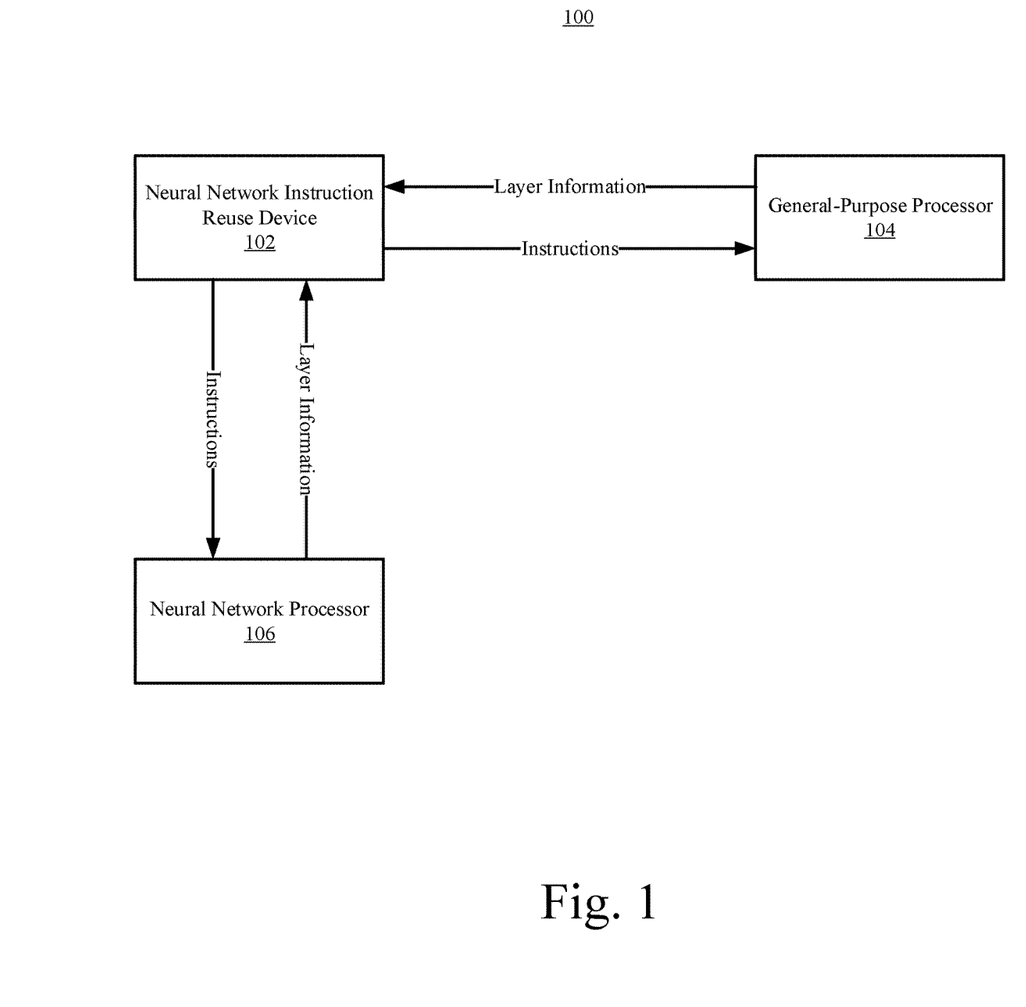
FIG. 1 illustrates a block diagram of an example neural network system in which neural network instruction generation may be implemented.

FIG. 1 illustrates a block diagram of an example neural network system 100 in which neural network instruction generation may be implemented.

As depicted, a neural network instruction reuse device 102 may be provided in communication with a general-purpose processor 104 and/or a neural network processor 106. The neural network processor 106 may refer to a processor designated for neural network operations. The neural network processor 106 may include instruction set processors and/or relevant chip sets and/or special-purpose microprocessors (e.g., Application Specific Integrated Circuits (ASIC)). The neural network processor 106 may also include on-chip storage device for caching.

In some examples, the neural network instruction reuse device 102 may receive layer information of a current neural network layer from the general-purpose processor 104 or the neural network processor 106. Based on the received layer information of the current layer, the neural network instruction reuse device 102 may be configured to calculate a hash value of the current layer and to determine whether the hash value matches at least one hash value previously calculated for another neural network layer. If so, one or more instructions that correspond to the previously calculated hash value may be reused for the current layer. In other words, the instructions previously generated for another layer may be modified for the operations of the current layer. If the hash value does not match any previously calculated hash value, the neural network instruction reuse device 102 may be configured generate one or more instructions for the current layer, which may be interchangeably referred to as "current instructions."

In either case, the previously generated instructions or the current instructions may be respectively transmitted to the general-purpose processor 104 and/or the neural network processor 106.

Figure 2:
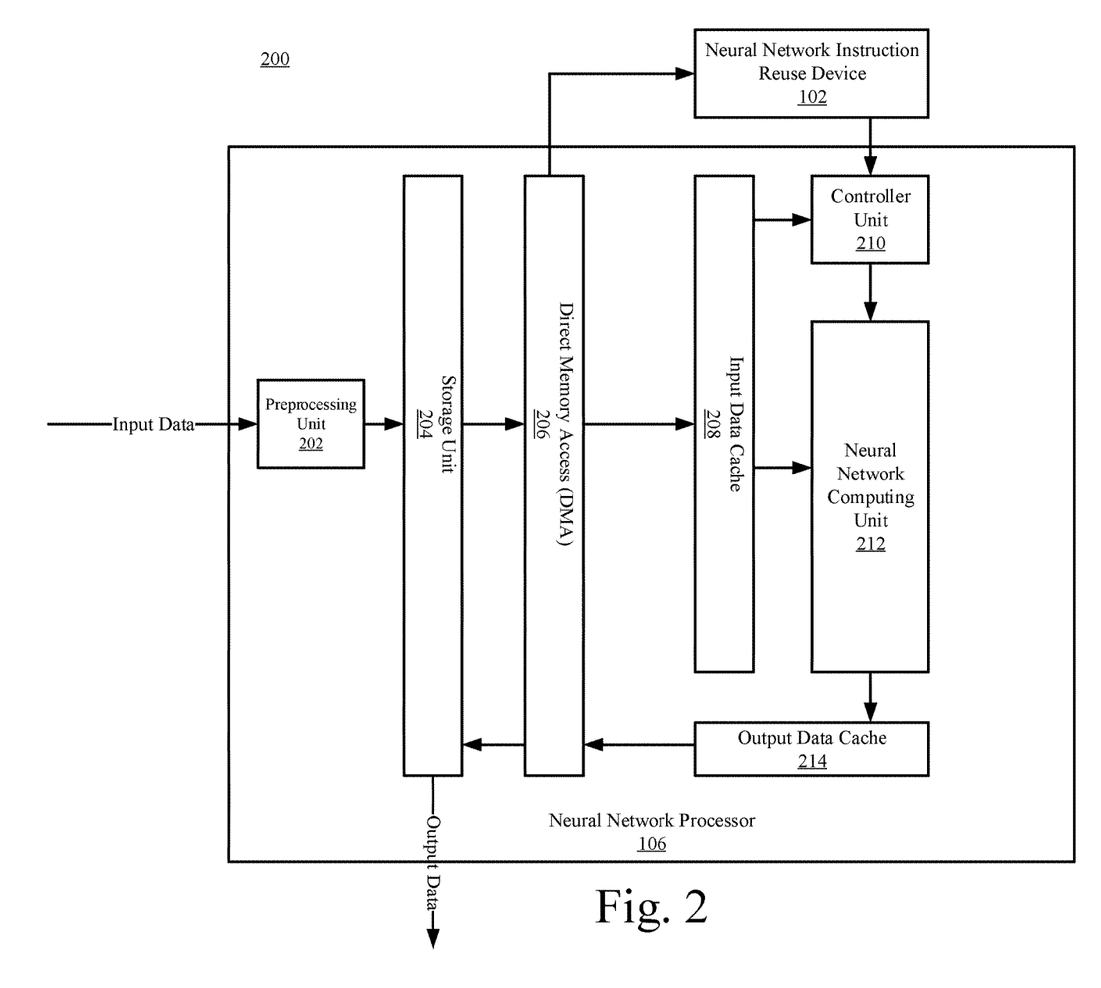
FIG. 2 illustrates a block diagram of another example neural network system in which neural network instruction generation may be implemented.

FIG. 2 illustrates a block diagram of another example neural network system 200 in which neural network instruction generation may be implemented.

As depicted, the neural network processor 106 may include a preprocessing unit 202, a storage unit 204, a direct memory access (DMA) 206, an input data cache 208, a controller unit 210, a neural network computing unit 212, and an output data cache 214. The aforementioned components may be implemented as software, hardware, firmware, or any combination thereof.

The preprocessing unit 202 may be configured to receive input data for a current layer of a multilayer neural network and preprocess the input data. In some examples, the input data may be output data from a previous layer in the multilayer neural network. In some other examples where the current layer is the first layer of the multilayer neural network, the input data may be received from an external storage device (not shown) or other hardware components. In more detail, the preprocessing unit 202 may be configured to perform one or more operations including segmentation, Gauss filtering, binarization, regularization, normalization to the input data. The preprocessed input data may be transmitted to the storage unit 204.

The DMA 206 may be configured to retrieve the input data from the storage unit 204 and transmit layer information of a current layer to the neural network instruction reuse device 102.

As described above, the neural network instruction reuse device 102 may be configured to modify one or more previously generated instructions or generate one or more current instructions based on a hash value of the current layer. In either case, the modified instructions or the current instructions may be transmitted to the controller unit 210. The controller unit 210 may be configured to execute the received instructions to control the operations of the neural network computing unit 212. Results of the operations may be transferred as output data to the output data cache 214 and further transmitted to the DMA 206. The storage unit 204 may be configured to store the output data and/or transmitted the output data to other external devices.

Figure 3:
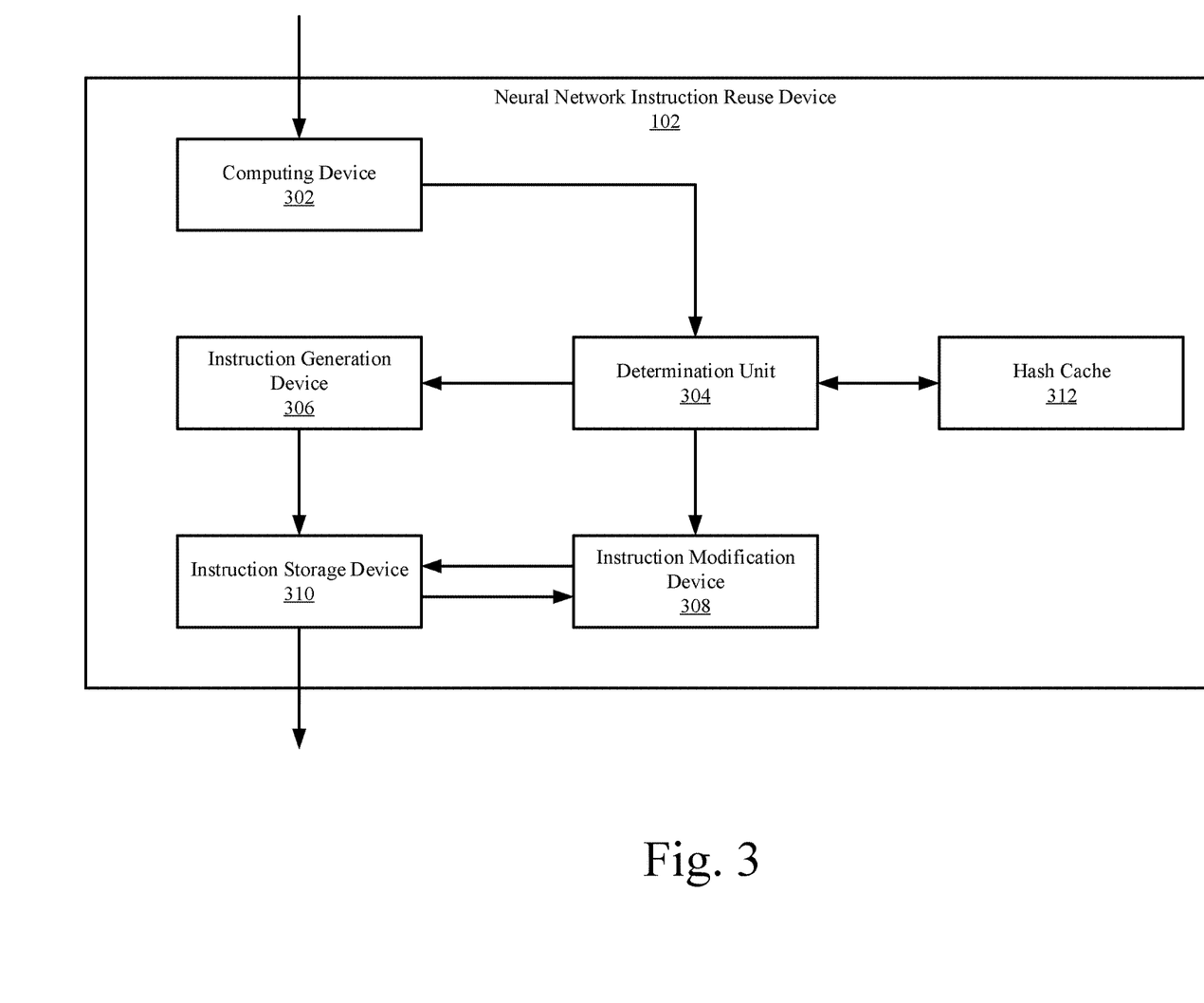
FIG. 3 illustrates a block diagram of an example neural network instruction reuse device by which neural network instruction generation may be implemented.

FIG. 3 illustrates a block diagram of an example neural network instruction reuse device 102 by which neural network instruction generation may be implemented. As depicted, the neural network instruction reuse device 102 may include a computing device 302, a determination unit 304, an instruction generation device 306, an instruction modification device 308, an instruction storage device 310, and a hash cache 312. The aforementioned components may be implemented as software, hardware, firmware, or any combination thereof.

In some examples, the computing device 302 may receive layer information of the current layer from one or more external devices, e.g., the DMA 206. The layer information of the current layer may include a serial number of the current layer, a layer type, a layer scale, a computation type, or any combination thereof. As described above, the current layer may not be the first layer of the multilayer neural network. The computing device 302 may be configured to determine whether the serial number of the current layer meets a predetermined condition, e.g., greater than a threshold value. In other words, a system administrator can specify one or more layers of the multilayer neural network for reusing instructions.

If the serial number of the current layer meets the predetermined condition, the computing device 302 may be configured to calculate a hash value of the current layer based on the layer information in accordance with a hash algorithm, e.g., MD5, SHA1, etc. In some examples, the layer type may refer to a type of the current layer, e.g., convolution layer, full connection layer, down sampling layer, normalization layer, and activation layer. The layer scale may include one or more parameters that may describe the complexity and the amount of computation at the current layer. For example, the one or more parameters may include a size of the input data, a size of output data, a size of a sampling window, a stride, and a count of sampling windows. The computation type may refer to one of sparse computation, dense computation, 1-bit computation, fixed-point number computation, floating-point number computation, etc.

The calculated hash value may be transmitted to the determination unit 304. In some examples, the determination unit 304 may be configured to retrieve a hash table stored in the hash cache 312 and search the hash table to determine whether the calculated hash value exists in the hash table.

For example, the hash table may include one or more entries similar to the following:

TABLE 1

| Serial Number of Layers | Layer Type | Layer Scale | Hash Value | Head Address |
|---|---|---|---|---|
| 1 | CONV | input(9, 9), kernel(5, 5), stride(1, 1) | 9d28 | 0x10000000 | in which the entry indicates that the first layer in the multilayer neural network is a convolution layer. The size of the input data of the first layer is 9 by 9; the size of the convolution kernel is 5 by 5; and the stride for sliding the convolution kernel is 1 by 1. The entry may further indicate that a previously calculated hash value for the first layer is 9d28 and instructions for the first layer are stored in a storage space starting from a head address of 0x10000000.

The determination unit 304 may be configured to determine whether the calculated hash value matches any hash value in the hash table. For example, if the calculated hash value equals to the previously calculated hash value 9d28, the determination unit 304 may transmit the head address 0x10000000 to the instruction modification device. In other words, when two hash value are equal, it is considered that the two corresponding layers may be substantially similar and, thus, previously generated instructions may be reused for the current layer.

Upon receiving the head address from the determination unit 304, the instruction modification device 308 may be configured to read one or more instructions that were previously generated, e.g., for the first layer, from the instruction storage device. Further, the instruction modification device 308 may be configured to modify the previously generated instructions for the current layer. For example, addresses of the input data and the output data associated with the previously generated instructions may be modified for the current layer.

In an example where the calculated hash value does not match any previously calculated hash value stored in the hash table, the determination unit 304 may be configured to write the calculated hash value and a head address for instructions of the current layer into the hash table. In this example, the instruction generation device 306 may be configured to generate one or more instructions for the current layer in accordance with conventional method. For example, if the current layer is a full connection layer where the size of input data is 9, the size of output data is 9, the operation is 32-bit fixed-point operation, and the output data is required to be activated, the "full connection layer" may be indicated by a field Z1, "the number of input data is 9" may be indicated by a field Z2, "the number of output data is 9" may be indicated by a field Z3, "the operation is 32-bit fixed-point operation" may be indicated by a field Z4, and "the output is required to be activated" may be indicated by a field Z5. The final generated binary instruction may be a combination of Z1, Z2, Z3, Z4, and Z5. The one or more generated instructions may be similarly stored in the instruction storage device 310 and may be further transmitted to the general-purpose processor 104 or the controller unit 210 in the neural network processor 106.

Figure 4:
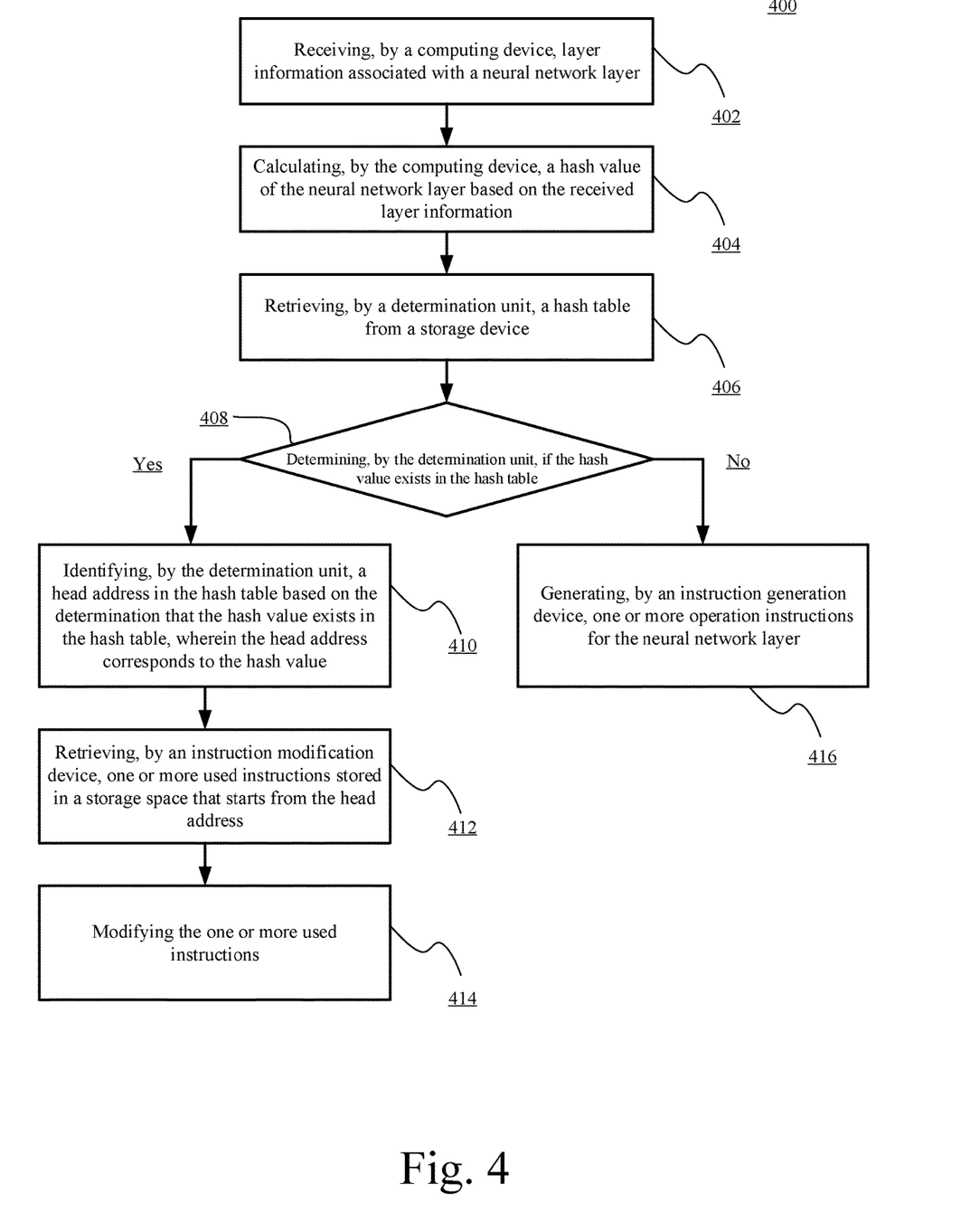
FIG. 4 illustrates a flow chart of an example process for generating neural network instructions.

FIG. 4 illustrates a flow chart of an example process 400 for generating neural network instructions. The example process 400 may be performed by one or more components described in accordance with FIGS. 1-3.

At block 402, the example process 400 may include receiving, by a computing device, layer information associated with a neural network layer. For example, the computing device 302 may receive layer information of the current layer from one or more external devices, e.g., the DMA 206. The layer information of the current layer may include a serial number of the current layer, a layer type, a layer scale, or any combination thereof. As described above, the current layer may not be the first layer of the multilayer neural network. The computing device 302 may be configured to determine whether the serial number of the current layer meets a predetermined condition, e.g., greater than a threshold value. In other words, a system administrator can specify one or more layers of the multilayer neural network for reusing instructions.

At block 404, the example process 400 may include calculating, by the computing device, a hash value of the neural network layer based on the received layer information. For example, if the serial number of the current layer meets the predetermined condition, the computing device 302 may be configured to calculate a hash value of the current layer based on the layer information in accordance with a hash algorithm, e.g., MD5, SHA1, etc. In some examples, the layer type may refer to a type of the current layer, e.g., convolution layer, full connection layer, down sampling layer, normalization layer, and activation layer. The layer scale may include one or more parameters that may describe the complexity and the amount of computation at the current layer. For example, the one or more parameters may include a size of the input data, a size of output data, a size of a sampling window, a stride, and a count of sampling windows.

At block 406, the example process 400 may include retrieving, by a determination unit, a hash table from a storage device. For example, the determination unit 304 may be configured to retrieve a hash table stored in the hash cache 312.

At decision block 408, the example process 400 may include determining, by the determination unit, if the hash value exists in the hash table. For example, the determination unit 304 may be configured to search the hash table to determine whether the calculated hash value exists in the hash table. If the calculated hash value exists in the hash table, the example process 400 may continue to block 410; if not, the example process 400 may continue to block 416.

At block 410, the example process 400 may include identifying, by the determination unit, a head address in the hash table based on the determination that the hash value exists in the hash table, wherein the head address corresponds to the hash value. For example, the determination unit 304 may be configured to identify the head address that corresponds to the matching hash value in the hash table.

At block 412, the example process 400 may include retrieving, by an instruction modification device, one or more used instructions stored in a storage space that starts from the head address. For example, the instruction modification device 308 may be configured to read one or more instructions that were previously generated, e.g., for the first layer, from the instruction storage device.

At block 414, the example process 400 may include modifying the one or more used instructions. For example, the instruction modification device 308 may be configured to modify the previously generated instructions for the current layer. In more detail, addresses of the input data and the output data associated with the previously generated instructions may be modified for the current layer by the instruction modification device 308.

At block 416, the example process 400 may include generating, by an instruction generation device, one or more operation instructions for the neural network layer. In an example where the calculated hash value does not match any previously calculated hash value stored in the hash table, the determination unit 304 may be configured to write the calculated hash value and a head address for instructions of the current layer into the hash table. In this example, the instruction generation device 306 may be configured to generate one or more instructions for the current layer in accordance with conventional method. The one or more generated instructions may be similarly stored in the instruction storage device 310 and may be further transmitted to the general-purpose processor 104 or the controller unit 210 in the neural network processor 106.

The process or method described in the above accompanying figures can be performed by process logic including hardware (for example, circuit, specific logic etc.), firmware, software (for example, a software being externalized in a non-transitory computer-readable medium), or the combination of the above two. Although the process or method described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Implementation of reusing neural network instructions described in FIGS. 1-3 may include hardware devices and the hardware devices may include transistors, memristors, etc. The processors such as the neural network processor 106, the computing device 302, the determination unit 304, the instruction modification device 308, and/or the instruction generation device 306 may be any suitable hardware processor, such as CPU, GPU, FPGA, DSP, ASIC, etc. Storage devices such as the hash cache 312, the instruction storage device 310, the input data cache 208, the output data cache 214, and/or the storage unit 204 may be any suitable magnetic storage medium or magneto-optical storage medium, such as RRAM, DRAM, SRAM, EDRAM, HBM, HMC, etc.

We claim:

1. A neural network instruction reuse device, comprising:
   a computing device configured to:
      receive layer information associated with a neural network layer, wherein the layer information includes at least one of a layer type, a layer scale, or an indicator that indicates a computation type of the neural network layer, and
      calculate a hash value of the neural network layer using the received layer information that includes the indicator of the computation type of the neural network layer as inputs;
   a determination circuit configured to:
      retrieve a hash table from a storage device,
         wherein the hash table includes one or more of the previously calculated hash values of the neural network layer and one or more corresponding head addresses, and
         wherein each of the one or more head addresses indicates a beginning of a storage space that stores a previously used instruction for neural network layer operation,
      determine to reuse a used instruction by determining that the calculated hash value matches one of the one or more previously calculated hash values in the hash table, and
      identify one of the head addresses that corresponds to the previously generated hash value that matches the calculated hash value, and
   an instruction modification circuit configured to:
      based on the determination to reuse the used instruction by the determination circuit, retrieve the used instruction stored from the identified head address in a storage space, and
      modify the used instruction.

2. The neural network instruction reuse device of claim 1, further comprising:
   an instruction generation circuit configured to generate one or more current instructions for the neural network layer based on a determination that the hash value does not exist in the hash table.

3. The neural network instruction reuse device of claim 1, wherein the layer type is one selected from a group consisting of convolution layer, full connection layer, down sampling layer, normalization layer, and activation layer.

4. The neural network instruction reuse device of claim 1, wherein the layer scale includes at least one of a first size of input data, a second size of output data, a third size of a first sampling window, a stride, or a count of second sampling windows.

5. The neural network instruction reuse device of claim 1, wherein the computation type is one selected from a group consisting of sparse computation, dense computation, 1-bit computation, fixed-point number computation, and floating-point number computation.

6. The neural network instruction reuse device of claim 1, wherein the hash table includes at least one of layer serial number, layer type, layer scale, previously generated hash values, or previously generated head addresses.

7. The neural network instruction reuse device of claim 2, wherein the instruction generation circuit is further configured to store the one or more current instructions in an instruction storage device.

8. The neural network instruction reuse device of claim 2, wherein the determination circuit is further configured to store the hash value and the one or more current instructions in the hash table based on a determination that the hash value does not exist in the hash table.

9. The neural network instruction reuse device of claim 1, wherein the instruction modification circuit is further configured to transmit the modified used instruction with modified input addresses and output addresses to a controller unit of a neural network processor.

10. A method for generating neural network instructions, comprising:
receiving, by a computing device, layer information associated with a neural network layer, wherein the layer information includes at least one of a layer type, a layer scale, or an indicator that indicates a computation type of the neural network layer;
calculating, by the computing device, a hash value of the neural network layer using the received layer information that includes the indicator of the computation type of the neural network layer as inputs;
retrieving, by a determination circuit, a hash table from a storage device,
wherein the hash table includes one or more of the previously calculated hash values and one or more corresponding head addresses, and
wherein each of the one or more head addresses indicates a beginning of a storage space that stores a previously used instruction for neural network layer operation,
determining, by the determination circuit, to reuse a used instruction by determining that the calculated hash value matches one of the one or more previously calculated hash values in the hash table;
identifying, by the determination circuit, one of the head addresses that corresponds to the previously generated hash value that matches the calculated hash value;
in response to the determination by the determination circuit to reuse the used instruction, retrieving, by an instruction modification circuit, the used instruction stored from the identified head address in a storage space; and
modifying, by the instruction modification circuit, the used instruction.

11. The method of claim 10, further comprising:
generating, by an instruction generation circuit, one or more current instructions for the neural network layer based on a determination that the hash value does not exist in the hash table.

12. The method of claim 10, wherein the layer type is one selected from a group consisting of convolution layer, full connection layer, down sampling layer, normalization layer, and activation layer.

13. The method of claim 10, wherein the layer scale includes at least one of a first size of input data, a second size of output data, a third size of a first sampling window, a stride, or a count of second sampling windows.

14. The method of claim 10, wherein the computation type is one selected from a group consisting of sparse computation, dense computation, 1-bit computation, fixed-point number computation, and floating-point number computation.

15. The method of claim,10 wherein the hash table includes at least one of layer serial number, layer type, layer scale, previously generated hash values, or previously generated head addresses.

16. The method of claim 11, further comprising storing, by the instruction generation circuit, the one or more current instructions in an instruction storage device.

17. The method of claim 11, further comprising storing, by the determination circuit, the hash value and the one or more current instructions in the hash table based on a determination that the hash value does not exist in the hash table.

18. The method of claim 10, further comprising transmitting, by the instruction modification circuit, the used instruction with modified input addresses and output addresses to a controller unit of a neural network processor.

19. A non-transitory computer-readable medium comprising instructions, which when executed by a processor causes the processor to perform operation for generating neural network instructions, the operations comprising:
receiving layer information associated with a neural network layer, wherein the layer information includes at least one of a layer type, a layer scale, or an indicator that indicates a computation type of the neural network layer;
calculating a hash value of the neural network layer using the received layer information that includes the indicator of the computation type of the neural network layer as inputs;
retrieving a hash table from a storage device,
wherein the hash table includes one or more of the previously calculated hash values and one or more corresponding head addresses, and
wherein each of the one or more head addresses indicates a beginning of a storage space that stores a previously used instruction for neural network layer operation,
determining to reuse a used instruction by determining that the calculated hash value matches one of the one or more previously calculated hash values in the hash table;
identifying one of the head addresses that corresponds to the previously generated hash value that matches the calculated hash value;
in response to the determination to reuse the used instruction, retrieving the used instruction stored from the identified head address in a storage space; and
modifying the used instruction.

20. The non-transitory computer-readable medium of claim 19, wherein the operations further comprise generating one or more current instructions for the neural network layer based on a determination that the hash value does not exist in the hash table.

21. A neural network instruction reuse system, comprising:
- a processor; and
- a neural network instruction reuse device that includes:
  - a computing device configured to:
    - receive layer information associated with a neural network layer, wherein the layer information includes at least one of a layer type, a layer scale, or an indicator that indicates a computation type of the neural network layer, and
    - calculate a hash value of the neural network layer using the received layer information that includes the indicator of the computation type of the neural network layer as inputs,
  - a determination circuit configured to
  - retrieve a hash table from a storage device,
    - wherein the hash table includes one or more of the previously calculated hash values of the neural network layer and one or more corresponding head addresses, and
    - wherein each of the one or more head addresses indicates a beginning of a storage space that stores a previously used instruction for neural network layer operation,
    - determine to reuse a used instruction by determining that the calculated hash value matches one of the one or more previously calculated hash values in the hash table, and
    - identify one of the head addresses that corresponds to the previously generated hash value that matches the calculated hash value, and
  - an instruction modification circuit configured to:
    - retrieve the used instruction stored from the identified head address in a storage space based on the determination to reuse the used instruction by the determination circuit and
    - modify the used instruction.

22. The neural network instruction reuse system of claim 21, wherein the processor is a general-purpose processor and a neural network processor.

* * * * *